Dec. 13, 1966     C. J. CRANE ET AL     3,291,099
ANIMAL EXERCISER
Filed June 18, 1965                                    2 Sheets-Sheet 1
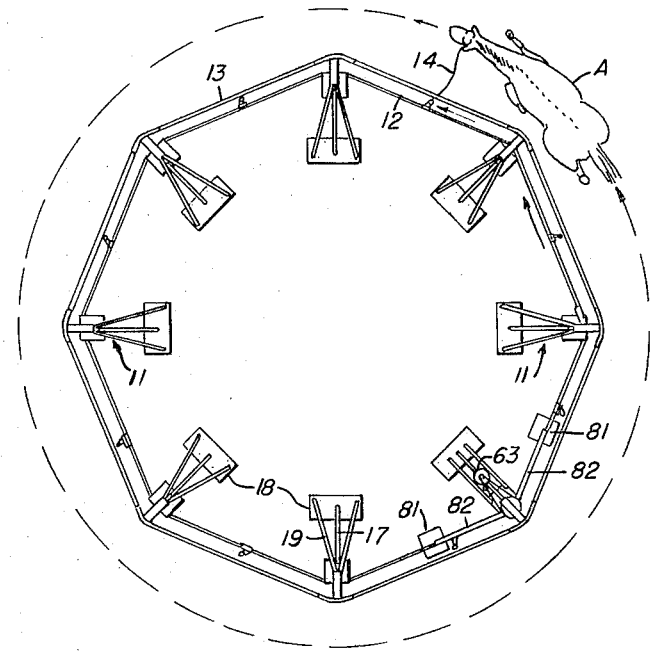
FIG. 1
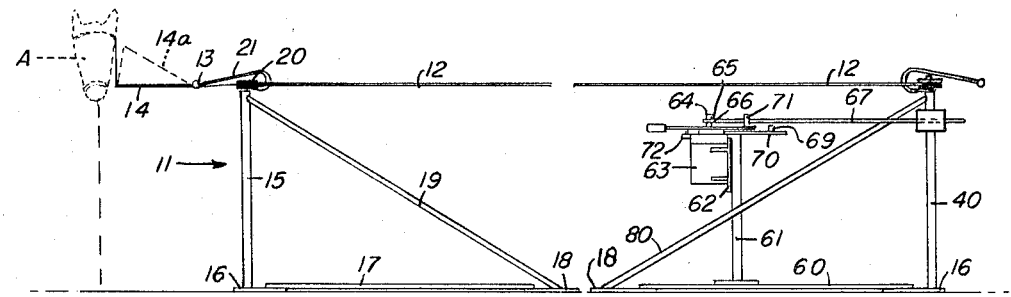
FIG. 2                  FIG. 3
INVENTORS
THERON DALE CREWS
CARL J. CRANE Dec. 13, 1966  C. J. CRANE ETAL  3,291,099
ANIMAL EXERCISER
Filed June 18, 1965  2 Sheets-Sheet 2
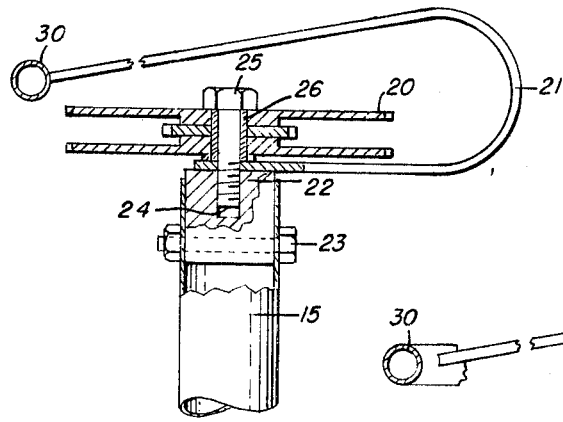
FIG. 4
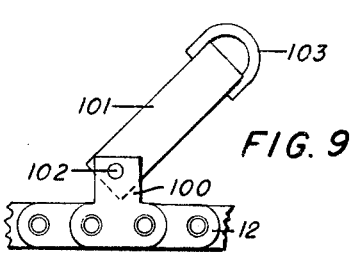
FIG. 9
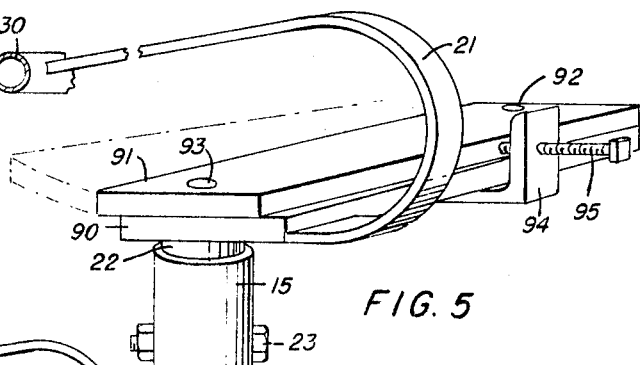
FIG. 5
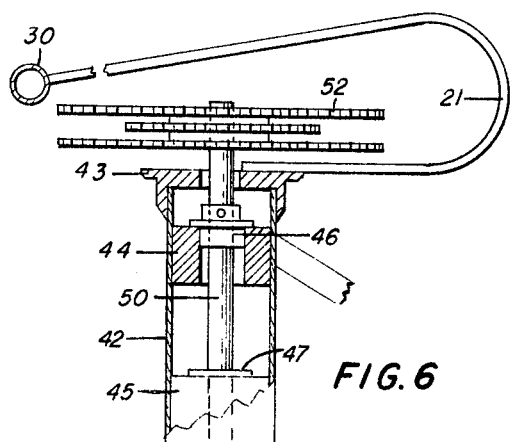
FIG. 6
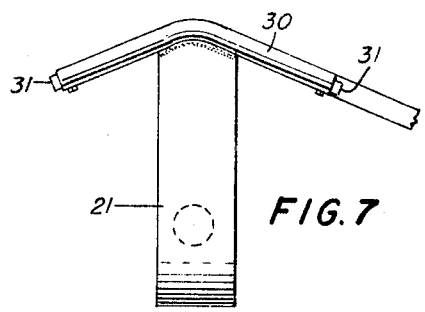
FIG. 7
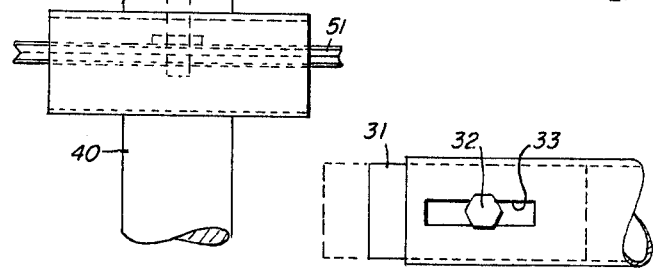
FIG. 8
INVENTORS
THERON DALE CREWS
CARL J. CRANE

United States Patent Office 3,291,099
Patented Dec. 13, 1966

3,291,099
ANIMAL EXERCISER
Carl J. Crane, San Antonio, Tex., and Theron Dale Crews, 213 St. Andrew, Gonzales, Tex.; said Crane assignor to said Crews
Filed June 18, 1965, Ser. No. 465,100
6 Claims. (Cl. 119—29)

This invention relates to an animal exerciser. More particularly, this invention relates to an animal exerciser particularly useful in exercising horses in a convenient manner and location.

It has been determined that it is exceedingly desirable to exercise horses in order to maintain them in the best condition. Oftentimes this type of exercise takes the form of walking or riding the horse. Merely walking or riding a horse, when necessary, requires the labor of one man per horse. Consequently, an animal exerciser of a machine type which may exercise one or more animals at the same time is a very desirable machine.

Consequently, it is a primary object of the present invention to disclose the general concepts attendant an animal exerciser.

It is another object of the present invention to disclose an animal exerciser which has portability and may be set up in different locations as desired.

It is yet another object of the present invention to disclose an animal exerciser which, once set up, does not require human attendance.

Other objects and advantages of the present invention will become apparent in reading the following description in conjunction with the drawings, in which:

FIGURE 1 is a general plan view of the present invention;

FIGURE 2 is a side elevation of one of the idler stanchions;

FIGURE 3 is a side elevation of the stanchion having the motive means with the side braces deleted;

FIGURE 4 is a partial sectional view of the upper portion of the idler stanchion;

FIGURE 5 is a detailed perspective view of the chain tightener stanchion;

FIGURE 6 is a partial sectional view of the power stanchion of FIGURE 3;

FIGURE 7 is a top plan view of the guide rail support element;

FIGURE 8 is a detailed view of the locking arrangement for the guide rail; and,

FIGURE 9 is a top plan view of a portion of the chain utilized in the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Now, turning to the drawings for a more detailed consideration of the present invention, special attention is directed to FIGURE 1. It will be noted therefrom that a plurality of stanchions, generally 11, are positioned to give an appearance of being on a peripheral line of a geometric figure. In the instance of FIGURE 1, it will be noted that by employing eight stanchions in spaced relationship, an octagonal geometric figure results. Pulley-like means are located on each of the stanchions. Placed in operative relationship with each of the pulley means is an endless flexible means 12, which may be a chain. The stanchions 11 are kept in rigid, spaced relationship by rigid connecting means 13 which also acts as a guide rail. A tether, shown generally as 14, connects the endless flexible means 12 with a suitable harness on the animal A. At this point is will be observed that as the endless flexible means 12 is moved through a horizontal plane by suitable driving means the animal A sketched in FIGURE 1 is forced to move with its tether 14. The animal describes an approximate circle as it is exercised. In the foregoing, eight stanchions have beeen utilized, however, the arrangement may be considerably enlarged or decreased in size as found desirable. By increasing the size it is possible to provide an animal exerciser which has less of a circular configuration but tends to describe an elliptical configuration or the like. Additionally, an important feature of the present invention is the fact that a plurality of animals may be tethered to the endless flexible means 12, thereby accommodating more than one animal at the same time.

Since, in the foregoing, a general concept has been presented, it is deemed appropriate at this point to delve into the greater concepts of the present invention in order to provide a full disclosure. Accordingly, attention is now directed to FIGURE 2 which shows one of the idler stanchions. It will be noted that the stanchion has an overall triangular configuration when viewed from the side. The vertical element 15 is welded to a suitable plate base 16. A horizontal brace 17 is welded to plate 16 and to inwardly positioned plate 18. An additional pair of braces 19 are welded to plate 18 and to the upper portion of vertical element 15, one of which can be seen in FIGURE 2. It has been found convenient to employ tubular members for the braces and the vertical element 15. Plates 16 and 18 have several holes for spikes in order to assist in securing the stanchions to the ground. A flanged sprocket 20 is rotatably mounted at the top of vertical element 15 on a vertical axle. More will be said about this below. Additionally, a U-shaped element 21 is also positioned at the top of vertical element 15.

It is advisable to consider the top portion of vertical element 15 in more detail, so attention is directed to FIGURE 4. It will be noted that vertical element 15 has a plug 22 which is secured in place by means of nut and bolt 23. Plug 22 has a threaded hole 24. U-shaped element 21 has one leg thereof welded to the top of plug 22. A bolt 25 is threaded into threaded hole 24 through a suitably positioned hole in the secured leg of U-shaped element 21. A bushing 26 is secured about bolt 25 to provide friction-free movement for the flanged sprocket 20 mounted by means of bolt 25 and bushing 26. It will be noted that the other leg of U-shaped element 21 extends outwardly from the center of the geometric figure and has a V-shaped tubular member 30 welded thereto.

FIGURE 7 shows a top plan view of tubular element 30 and the upper leg of U-shaped element 21. The tubular element 30, as arranged with each stanchion, provides coupling means for the rigid connecting means 13. It will be noted that an adjustable plug 31 is located at each end of tubular member 30 to act as a male member for the rigid connecting means 13 which is a tubular element having the ends thereof in association with the ends of the tubular member 30 and is carried by plugs 31 which extend into the connecting means 13. The plugs 31 are adjustable by virtue of a set screw 32 for each which extends perpendicularly into the side of plug 31 through slot 33 at each end of tubular member 30.

In the foregoing, attention has been directed to the stanchions carrying the sprockets which merely idle as the endless flexible means 12 is driven. As will be appreciated, in most instances it will be found desirable to employ a chain.

It has been found advantageous to modify one of the stanchions to provide means for mounting thereon a prime motive means which, preferably, is an electric motor. Consequently, attention is now directed to FIGURE 3 which, in essence, is very similar to the idler stanchions but has further modifications to accommodate the driving means. A consideration of the stanchion carrying the driving means should include FIGURES 3 and 6 together. First of all, a vertical tubular element 40 is provided which terminates in a housing 41 near the upper portion thereof. Housing 41 is open at least at the end facing the motive means. A further vertical tubular element 42 is secured to the upper side of housing 41 and terminates in a cap 43. Plugs 44 and 45 are positioned in tubular element 42 and are suitably drilled to accept friction reducing bearings 46 and 47. An axle 50 extends downwardly into housing 41 and has a pulley 51 keyed at one end. The axle 50 also extends upwardly through cap 43 and has a flanged sprocket 52 keyed thereto.

Tubular element 40 has at its lowermost end a plate 16 as in connection with the idler stanchions and another plate 18 also similar in configuration as in connection with the idler stanchions. A horizontal brace 60 connects plates 16 and 18 of the power supporting stanchion. Mounted thereon is a vertical element 61 which is in spaced relationship to the vertical element 40. A vertical plate 62 is secured to vertical element 61. A vertical electric motor 63 is adjustably mounted on plate 62. Pulleys 65 and 66 are keyed to the axle of the motor. The pulleys have different diameters for selective operation. Connecting one or the other of pulleys 65 and 66 with pulley 51 is an endless belt 67. Belt 67 has a belt tightener which includes a lever 68 pivoted at 69 to a horizontal plate 70 secured to the top of vertical element 61. Lever 68 has a ball bearing roller 71 which impinges on belt 67 to tighten or release the belt as the lever 68 is moved. Lever 68 is maintained in position by means at one end thereof by locking into a slotted bracket 72 mounted on the motor.

Brace 80 is welded at an angle to plate 18 and to tubular element 42. Vertical element 61 is also welded to brace 80 to maintain rigidity.

Additionally, in order to provide rigidity, the stanchion carrying the driving means also has side braces comprising plates 81 similar to plates 18 and 16 which have braces 82 and an angle at one end of each, being secured by welding to plates 81 and the other end welded to vertical element 40. These plates 81, as in connection with the other plates, are provided with holes for spikes 83, as can be seen from FIGURE 6, as an example.

In order to insure proper meshing of chain 12, for instance, in all the sprockets, and in particular the driving sprocket 52, a chain tightener is provided on one of the idler stanchions. For a detailed consideration of this facet of the invention attention is directed to FIGURE 5. Instead of mounting bolt 25 as an axle member directly into plug 22, a horizontal plate 90 is secured by suitable means to plug 22. Another horizontal plate 91 is in confronting relationship with plate 90. The two plates 90 and 91 are pivoted with respect to each other by pivot means 92. A threaded hole 93 is provided for bolt 25 and sprocket 20 (not shown) as in the other idler stanchions. In order to pivot the plates 90 and 91 with respect to each other, an L-shaped bracket 94 is secured to plate 90 by means of one leg thereof. The other leg extends vertically and has a set screw 95 suitably positioned through a threaded opening in the bracket and has its end thereof in abutment with one side of plate 91. It will be observed as set screw 95 is manipulated by turning in a clockwise direction it will be turned through bracket 94 thereby displacing, angularly, plate 91 to a greater degree to assume the dotted configuration shown in FIGURE 5. As this occurs the sprocket 20 carried by plate 91 will carry the chain in a manner so that a greater diameter for the endless chain is achieved, thereby tightening the chain.

In FIGURE 9 a portion of chain 12 is illustrated having a lug 100 secured to one or more of the links of the chain. A short horizontal bar 101 is pivotally mounted to lug 100 at pivot point 102. A loop 103 is secured to the other end of bar 101. A tether may be secured to loop 103 which is, in turn, tied to the animal A.

In FIGURE 2 a diagrammatic representation is shown of a horse's head with a tether 14. As the horse moves its head upwardly the tether slides along the connecting means 13 to the dotted line position 14a. In this manner the tether, rather than pulling directly on the chain 12, transfers the upward moment of the horse's pull to the connecting means 13 which acts as a guide rail and therethrough to U-shaped element 21. By making U-shaped element 21 of resilient metal a spring-like effect is achieved so that the kinetic forces due to the movement of the horse's head can be absorbed without transferring much of the pull to the chain and thereby to the stanchions.

What is claimed is:

1. Animal exerciser comprising a plurality of vertical stanchions, said stanchions arranged whereby each stanchion is at a point along the periphery of a geometric figure, pulley means rotatably mounted on said stanchions, endless flexible means in cooperative operation with said pulley means, means for driving said endless flexible means, tethering means secured to said endless flexible means for attachment to an animal, a substantially U-shaped member encompassing said pulley means, one leg of said U-shaped member secured to a stanchion, the other leg extending outwardly from said geometric figure over and beyond said pulley means, rigid means connecting each of said other legs to maintain them in spaced relationship and forming a guide rail beyond said pulley means for said tethering means upon upward movement of said tethering means.

2. Animal exerciser comprising a plurality of vertical stanchions, said stanchions arranged whereby each stanchion is at a point along the periphery of a geometric figure, pulley means rotatably mounted on said stanchions, an endless chain in cooperative operation with said pulley means, means for driving said chain mounted on at least one of the stanchions, tethering means secured to said chain for attachment to an animal, a substantially U-shaped member encompassing said pulley means, one leg of said U-shaped member being secured to a stanchion, the other leg extending outwardly from said geometric figure over and beyond said pulley means, rigid means connecting each of said other legs to maintain them in spaced relationship and forming a guide rail beyond said pulley means for said tethering means on upward movement of said tethering means.

3. Animal exerciser comprising a plurality of vertical stanchions, said stanchions arranged whereby each stanchion is at a point along the periphery of a geometric figure, pulley means rotatably mounted on said stanchions, an endless chain in cooperative operation with said pulley means, an electric motor for driving said chain mounted on at least one of the stanchions, tethering means secured to said chain for attachment to an animal, a substantially U-shaped member encompassing said pulley means, one leg of said U-shaped member secured to a stanchion, the other leg extending outwardly from said geometric figure over and beyond said pulley means, rigid means connecting each of said other legs to maintain them in spaced relationship and forming a guide rail beyond said pulley means for said tethering means upon upward movement of said tethering means.

4. Animal exerciser comprising a plurality of vertical stanchions, said stanchions arranged whereby each stanchion is at a point along the periphery of a geometric figure, a horizontal sprocket rotatably mounted near substantially the top of each of said stanchions, an endless chain in cooperative operation with each of said sprockets, an electric motor for driving said chain mounted on at least one of the stanchions, tethering means secured to said chain for attachment to an animal, a substantially U-shaped member encompassing each of said sprockets, one leg of said U-shaped member being secured to a stanchion, the other leg extending outwardly from said geometric figure over and beyond said sprockets, said sprocket being positioned between said legs, rigid means connecting each of said other legs to maintain them in spaced relationship and forming a guide rail beyond said sprockets for said tethering means upon upward movement of said tethering means.

5. Animal exerciser comprising a plurality of vertical stanchions, said stanchions arranged whereby each stanchion is at a point along the periphery of a geometric figure, a horizontal sprocket rotatably mounted near substantially the top of each of said stanchions, an endless chain in cooperative operation with said pulley means, an electric motor for driving said chain mounted on at least one of the stanchions, tethering means secured to said chain for attachment to an animal, a substantially U-shaped member encompassing each of said sprockets, one leg of said U-shaped member secured to the stanchion, the other leg extending outwardly from said geometric figure over and beyond said sprockets, said sprockets being positioned between said legs, said tubular coupling means positioned at the ends of said extending legs, tubular means connecting each of said other legs by means of said coupling means to maintain them in spaced relationship and forming a guide rail beyond said sprockets for said tethering means upon upward movement of said tethering means.

6. Animal exerciser comprising a plurality of vertical stanchions, said stanchions arranged whereby each stanchion is at a point along the periphery of a geometric figure, a horizontal sprocket means rotatably mounted near substantially the top of each of said stanchions, an endless chain in cooperative operation with said sprocket means, an electric motor for driving said chain mounted on at least one of the stanchions, tethering means secured to said chain for attachment to an animal, a substantially U-shaped member encompassing each of said sprockets, one leg of said U-shaped member being secured to the stanchion, the other leg extending outwardly from said geometric figure over and beyond said sprocket means, said sprocket means being positioned between said legs, tubular coupling means positioned at the ends of said extending legs, rigid means connecting each of said other legs by means of said coupling means to maintain them in spaced relationship and forming a guide rail beyond said sprocket means for said tethering means on upward movement of said tethering means, chain tightening means mounted on at least one stanchion including a first plate mounted on said stanchion, a second plate pivotally mounted on said first plate and in confrontation with each other, means for pivotally moving said second plate in relation to said first plate to vary the length of travel of said chain.

References Cited by the Examiner
UNITED STATES PATENTS

| | | | |
|---|---|---|---|
| 779,243 | 1/1905 | Smith | 119—120 |
| 2,500,805 | 3/1950 | Costello | 119—29 |

SAMUEL KOREN, *Primary Examiner.*

HUGH R. CHAMBLEE, *Examiner.*